Patented Feb. 20, 1940

2,191,259

UNITED STATES PATENT OFFICE 2,191,259

INSECTICIDE

Kaspar Pfaff and Michael Erlenbach, Frankfort-on-the-Main-Hochst, Germany, assignors to Winthrop Chemical Company, Inc., New York, N. Y., a corporation of New York No Drawing. Application April 1, 1937, Serial No. 134,424. In Germany April 11, 1936

8 Claims. (Cl. 167—30)

The present invention relates to insecticides.

In the U. S. Patent No. 1,562,510 there is described a process for protecting wool, furs and the like from damage by moths by treating them with chemical substances containing the group

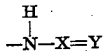

wherein X stands for nitrogen or carbon and Y stands for nitrogen, carbon or a ring. In this process the compounds described have a food deterrent action on the moth caterpillars so that the fabrics treated are protected from injury.

Now we have found that diazoamino compounds free from sulfonic acid groups and carboxyl groups are especially suitable for combating and poisoning insects or caterpillars such as those of the brown-tail moth (Porthesia chrysorrhoea) and of the annulary caterpillar (Gastropacha neustria) as well as cockroaches and other pests. A food treated in the usual manner with the compounds named above is readily eaten by the pests and in the same quantity as non-treated food. The diazoamino compounds have even in a small proportion a very strong poisonous action on the pests and kill them.

Destructive agents for cockroaches may, for instance, be prepared with a content of only 2.5 per cent of phenyldiazopiperidine of the formula: $C_6H_5$—$N$=$N$—$NC_5H_{10}$. If this agent is strewn into the lurking places of the cockroaches it is immediately eaten and leads to the destruction of the insects.

The following compounds, for instance, among others, have the same action:

p-Nitrophenyldiazoaminobenzene
p-Chlorophenyldiazobenzylamine
4-chloro-2-methoxyphenyldiazoamino-2'-meth-oxy-4'-chlorobenzene
Phenyldiazohexahydrocollidine
o-Methylphenyldiazo-piperidine
p-Thiocyanate of phenyldiazo-piperidine Such compounds may be applied both in the form of spraying agents and in the form of pulverulent agents. In order to improve the wetting and adhesive power the usual wetting agents, for instance, salts of aromatic sulfonic acids of a high molecular weight, hydroxyethylated compounds such as hydroxyethylated phenols and the like may be added. Furthermore it may be suitable to add inert substances such as prepared chalk, talcum or kaoline. Also mixtures with known food poisons, for instance, calcium arsenate or with known contact poisons, for instance, nicotine, pyrethrum or derris may be prepared. As decoys there may be added sugar, honey, amylacetate and the like.

The excellent action of such an agent is shown by the results of the following tests:

| Agent | Number of the experimental individuals Phillodromia germanica | Dead after— | |
|---|---|---|---|
| | | 2 days in percent | 4 days in percent |
| Unpoisoned food | 20 | 0 | 0 |
| Comparison agent with 17 percent of arsenic in the form of Schweinfurt green | 20 | 10 | 40 |
| Comparison agent with 90 percent of sodium fluoride | 20 | 10 | 60 |
| Agent with 2.5 percent of phenyl-diazopiperidine | 20 | 40 | 100 |

Diazoamino compounds act in the same manner also on leaf-eating caterpillars as can be seen from the following tests made in comparison with calcium arsenate and lead arsenate:

| Agent | Concentration used | Experimental individuals: caterpillars of brown-tail moths | Dead after— | |
|---|---|---|---|---|
| | | | 3 days | 6 days |
| | Percent | | Percent | Percent |
| Calcium arsenate | 0.4 | 20 | 40 | 70 |
| Lead arsenate | 0.4 | 20 | 45 | 80 |
| Diazoamino benzene | 0.4 | 20 | 60 | 95 |
| Diazoamino benzene | 1 | 20 | 70 | 100 |

These tests also show that in contradistinction to the said compounds containing arsenic and which on account of their high toxicity and on account of the danger of cauterizing the plant may be used only in relatively small doses, the diazoamino compounds being innocuous for the plants and only feebly poisonous substances may also be used without danger in high concentrations.

We claim:

1. Insecticides comprising a diazoamino compound free from sulfonic acid groups and carboxyl groups.

2. Insecticides comprising an inert substance and a diazoamino compound free from sulfonic acid groups and carboxyl groups.

3. Insecticides comprising an inert substance, a wetting agent and a diazoamino compound free from sulfonic acid groups and carboxyl groups.

4. Insecticides comprising an inert substance, a body of the group consisting of sugar, honey and amyl acetate and a diazoamino compound free from sulfonic acid groups and carboxyl groups.

5. Insecticides comprising phenyl-diazo-piperidine.

6. Insecticides comprising phenyl-diazo-piperidine and an inert substance.

7. Insecticides comprising phenyl-diazo-piperidine, an inert substance and a wetting agent.

8. Insecticides comprising phenyl-diazo-piperidine, an inert substance and a body of the group consisting of sugar, honey and amyl acetate.

KASPAR PFAFF.
MICHAEL ERLENBACH.